June 16, 1964     C. H. TOYER     3,137,488
MOTOR ROAD VEHICLE SUSPENSION
Filed March 4, 1963
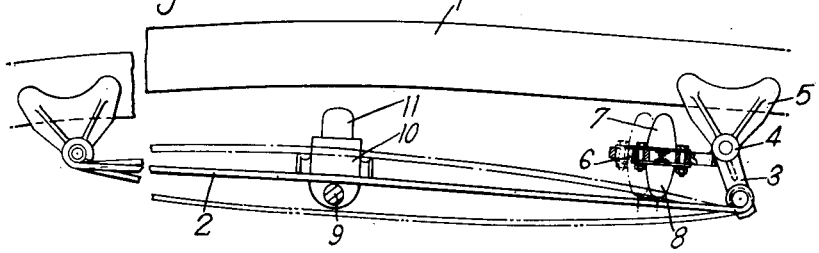
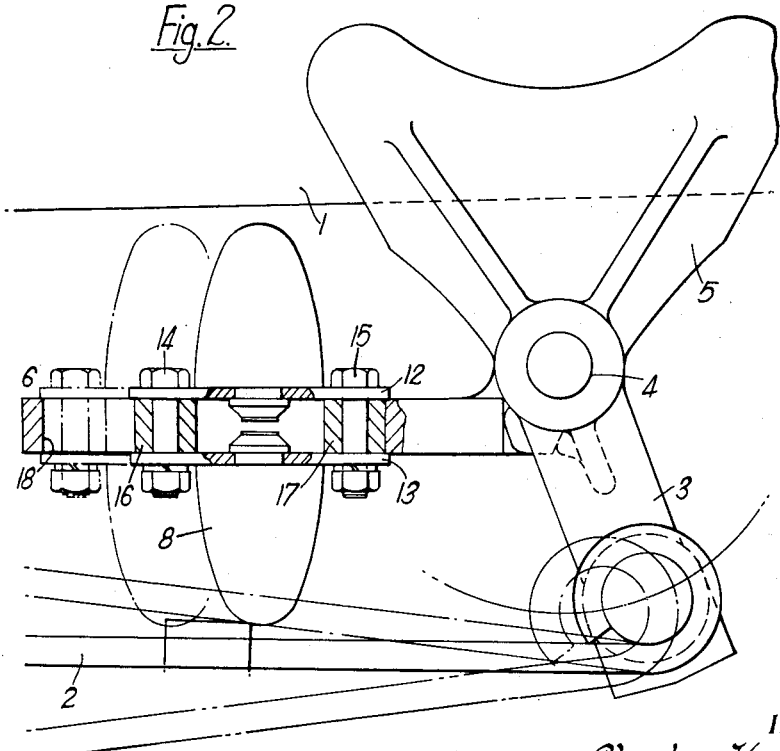
Inventor
Charles Henry Toyer
BY
W. F. Wagner
Attorney

United States Patent Office 3,137,488
Patented June 16, 1964

3,137,488
MOTOR ROAD VEHICLE SUSPENSION
Charles Henry Toyer, Luton, England, assignor to General Motors Corporation, Detroit, Mich., a corporation of Delaware
Filed Mar. 4, 1963, Ser. No. 262,571
Claims priority, application Great Britain Mar. 6, 1962
7 Claims. (Cl. 267—54)

This invention relates to motor vehicle suspensions.

The motor vehicle suspension according to the invention includes a variable-rate shackle for a longitudinal leaf spring.

The leaf spring may be a front leaf spring or a rear leaf spring, and the suspension according to the invention is also applicable to both the front and rear suspensions of a given vehicle.

The scope of the monopoly is defined by the appended claims; the invention and how it may be performed are hereinafter particularly described with reference to the accompanying drawings, in which:

FIGURE 1 is an elevation of a preferred embodiment of a motor vehicle suspension according to the invention; and FIGURE 2 is an enlarged elevation showing the mounting of the rear end of a longitudinal leaf spring by means of a variable-rate shackle forming part of the suspension shown in FIGURE 1.

As is shown in FIGURE 1, the front sprung portion 1 of the vehicle (indicated as part of the vehicle frame) is supported by a pair of longitudinal leaf springs 2, only the leaf spring on one side of the vehicle being shown. The rear end of each leaf spring is connected to one arm 3 of a bell crank lever which is mounted by way of a pivot pin 4 on a bracket 5 fixed to the vehicle frame 1. The second arm 6 of the bell crank lever carries resilient buffers 7 and 8 forming abutments on the opposite sides of the lever, the buffer 7 being above the arm 6 and the buffer 8 being below. The front axle 9 of the vehicle is connected to each leaf spring by means of a mounting 10 which also carries a bump stop buffer 11 for limiting excessive bump movement of the axle by contact with the vehicle frame.

The enlarged view of FIGURE 2 shows in more detail how the upper and lower buffers 7 and 8 are mounted on the arm 6 of the bell crank lever. As shown in this figure, the upper buffer 7 is secured to an upper plate 12, and the lower buffer 8 is secured to a lower plate 13. The plates are bolted together by means of bolts 14 and 15 with the interposition of spacers 16 and 17. The bolts 14 and 15 pass through a longitudinal slot 18 in the arm 6, and by slackening the bolts it is possible to alter the position of the buffers between the position shown in full lines in FIGURE 2 and the position shown in interrupted lines.

FIGURE 2 shows the relationship between the buffers 7 and 8, the vehicle frame 1 and the leaf spring 2 when the chassis of the vehicle is unladen. Thus, under a normal no-load condition both the buffers 7 and 8 are uncompressed, or virtually uncompressed. The imposition of a load on each spring 2 (bump condition) causes the spring 2 to rock the lever arm 3 anticlockwise, whereby the lower buffer 8 is compressed between the bell crank lever arm 6 and the upper leaf of the spring 2. The effective length of the spring is thereby shortened, so that the effective rate of the spring is increased. Conversely, under rebound conditions, the spring 2 rocks the lever arm 3 clockwise to compress the upper buffer between the bell crank lever arm 6 and the vehicle frame 1. The resulting compression of the upper buffer 7 opposes the rebound velocity, and again increases the effective rate of the spring.

The suspension according to the invention gives the vehicle anti-roll characteristics. When the vehicle rounds a corner, the outer spring is deflected under the increased load, thereby causing the lower buffer 8 to be compressed; deflection of the inner spring is reduced, with the result that the upper buffer 7 of that spring is compressed and opposes further deflection of the inner spring.

An advantage of the suspension according to the invention is that the buffers prevent the spring shackle from "toggling," that is, going past the vertical during extreme rebound conditions which sometimes occur with an unladen chassis.

Various modifications of the suspension according to the invention are possible within the scope of the appended claims. For example, the rubber buffers 7 and 8 described in the preferred embodiment are preferably of hard rubber, but could comprise masses of other relatively resilient material, or even relatively rigid abutments, for example metal abutments.

The front suspension forming the preferred embodiment of the invention requires very little modification to adapt it for use as a rear suspension, the main modification involving the angle of inclination of the bell crank lever arm 3 relatively to the vehicle frame.

I claim:

1. A suspension for the wheel axle of a motor vehicle, comprising a vehicle frame portion, a pair of longitudinally extending leaf springs resiliently interconnecting the vehicle frame portion and the wheel axle, a pair of bell crank levers pivotally connected to the vehicle frame portion, each bell crank lever comprising first and second arms the first of which is connected to one end of the respective leaf spring, a first abutment which is disposed between each leaf spring and the said second arm of the respective bell crank lever and is compressed between the leaf spring and the second arm of the bell crank lever in the bump condition of the respective leaf spring, and a second abutment which is disposed between the vehicle frame portion and the second arm of each bell crank lever and is compressed between the vehicle frame portion and the second arm in the rebound condition of the respective leaf spring.

2. A motor vehicle suspension according to claim 1, wherein the first and second abutments are secured to opposite sides of the second arm of the bell crank lever.

3. A motor vehicle suspension according to claim 2, wherein the abutments are movable longitudinally of the second arm of the bell crank lever.

4. A motor vehicle suspension according to claim 3, wherein the first and second abutments are secured to plates which are bolted together by means of bolts passing through a longitudinal slot in the second arm of the bell crank lever.

5. A suspension for the wheel axle of a motor vehicle, comprising a vehicle frame portion, a pair of longitudinally extending leaf springs resiliently interconnecting the vehicle frame portion and the wheel axle, a pair of bell crank levers pivotally connected to the vehicle frame portion, each bell crank lever comprising first and second arms the first of which is connected to one end of the respective leaf spring, a first rubber abutment which is disposed between each leaf spring and the said second arm of the respective bell crank lever and is compressed between the leaf spring and the second arm of the bell crank lever in the bump condition of the respective leaf spring, and a second rubber abutment which is disposed between the vehicle frame portion and the second arm of each bell crank lever and is compressed between the vehicle frame portion and the second arm in the rebound condition of the respective leaf spring.

6. A suspension for the wheel axle of a motor vehicle, comprising a vehicle frame portion, a pair of longitudinally extending leaf springs resiliently interconnecting the vehicle frame portion and the wheel axle, a pair of bell crank levers pivotally connected to the vehicle frame portion, each bell crank lever comprising first and second arms the first of which is connected to one end of the respective leaf spring, a first abutment of relatively rigid material which is disposed between each leaf spring and the said second arm of the respective bell crank lever and is compressed between the leaf spring and the second arm of the bell crank lever in the bump condition of the respective leaf spring, and a second abutment of relatively rigid material which is disposed between the vehicle frame portion and the second arm of each bell crank lever and is compressed between the vehicle frame portion and the second arm in the rebound condition of the respective leaf spring.

7. A suspension for the wheel axle of a motor vehicle, comprising a vehicle frame portion, a pair of longitudinally extending leaf springs resiliently interconnecting the vehicle frame portion and the wheel axle, a pair of bell crank levers pivotally connected to the vehicle frame portion, each bell crank lever comprising first and second arms the first of which is connected to one end of the respective leaf spring, a first metal abutment which is disposed between each leaf spring and the said second arm of the respective bell crank lever and is compressed between the leaf spring and the second arm of the bell crank lever in the bump condition of the respective leaf spring, and a second metal abutment which is disposed between the vehicle frame portion and the second arm of each bell crank lever and is compressed between the vehicle frame portion and the second arm in the rebound condition of the respective leaf spring.

References Cited in the file of this patent

UNITED STATES PATENTS

| | | |
|---|---|---|
| 1,429,367 | Oltsch | Sept. 19, 1922 |
| 1,524,743 | McMains | Feb. 3, 1925 |
| 1,577,693 | Dale | Mar. 23, 1926 |
| 1,766,288 | Dootson | June 24, 1930 |
| 1,934,892 | Tea | Nov. 14, 1933 |
| 2,203,056 | Kolbe | June 4, 1940 |
| 2,303,904 | Bell | Dec. 1, 1942 |